United States Patent Office 3,046,649
Patented July 31, 1962

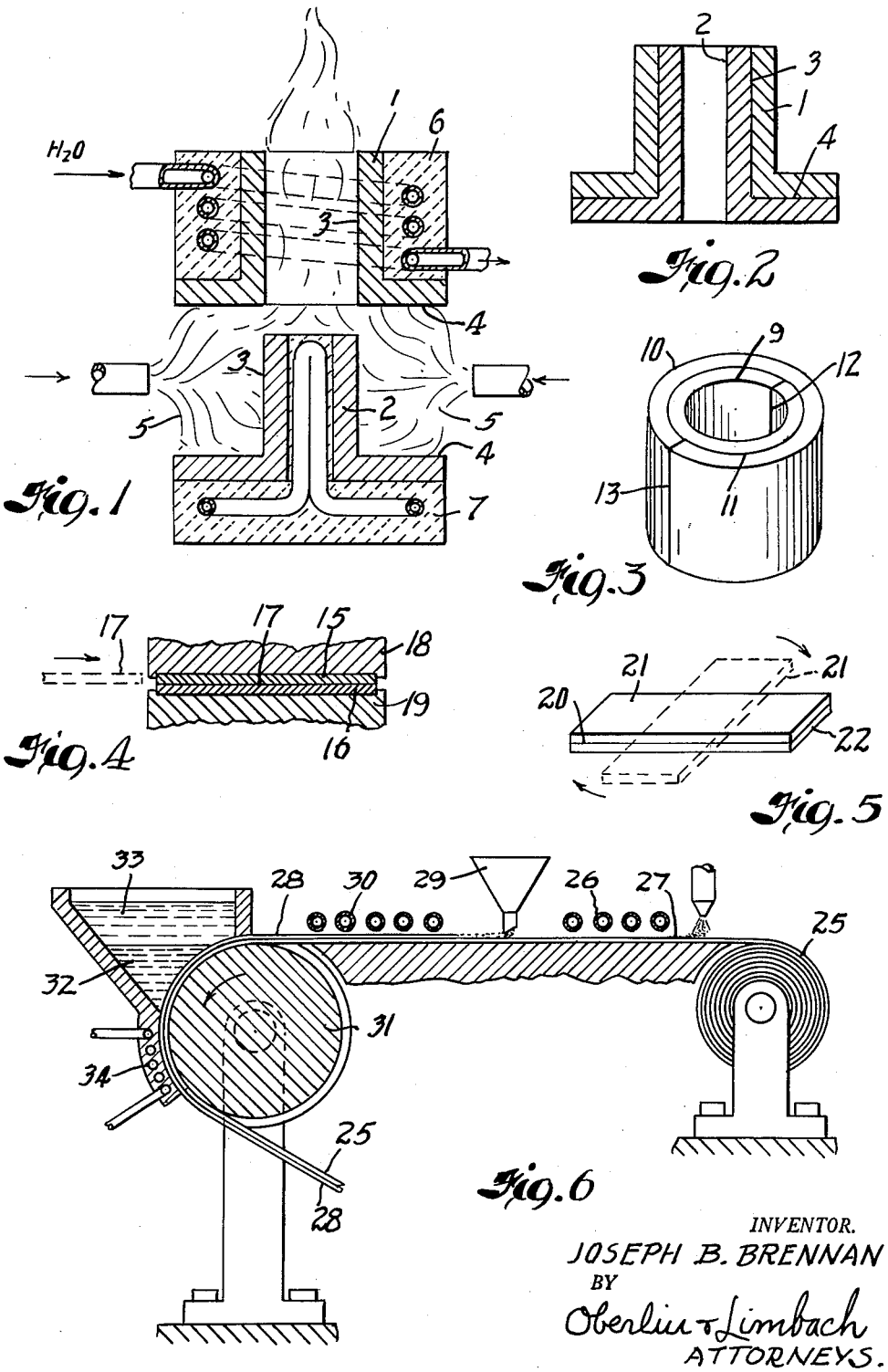

3,046,649
METHOD OF PRODUCING COMPOSITE
METAL ARTICLES
Joseph B. Brennan, 13018 Lake Shore Blvd., Cleveland, Ohio; Helen E. Brennan, executrix of said Joseph B. Brennan, deceased
Filed Oct. 11, 1954, Ser. No. 461,461
7 Claims. (Cl. 29—474.3)

The present invention relates generally as indicated to a method of producing composite metal articles, and more particularly to a method of bonding or uniting metals for producing bearings or the like consisting of a backing member and a bearing alloy member.

It is an object of this invention to provide a method as aforesaid by which dissimilar metals may be effectively bonded together.

Another object of this invention is to provide a method of bonding together dissimilar metals for use in composite bearings or the like without substantially disturbing the dimensions, the distribution of the alloying ingredients, and the tensile strengths, compressive strengths, hardnesses, and other phyical characteristics of the respective components after being joined together as compared with their chemical and physical properties prior to thus being joined together.

Another object of this invention is to provide a method by which uniformly good bonding between metal components is achieved.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a cross-section view illustrating the heating step of my method;

FIG. 2 is a cross-section view of the parts shown in FIG. 1 in their assembled condition, bonded together;

FIG. 3 illustrates a composite article in which a plurality of split bushings have been joined together by my method;

FIG. 4 illustrates composite or laminated strip metal produced by my method;

FIG. 5 is a perspective view of a composite or laminated strip produced by my method; and FIG. 6 is a diagrammatic view of apparatus for impregnating a sintered metal layer of a composite strip.

Referring now more particularly to the drawing, and first to FIGS. 1 and 2 thereof, the composite article is shown as comprising two flanged tubular components 1 and 2 interfitted and joined together along the closely fitted telescoped surfaces 3 thereof and along the abutting flange surface 44.

In order to assemble the two components 1 and 2 according to my method, the to-be-joined surfaces 3 and 4 just referred to are first heated to predetermined temperatures as by means of high intensity heating flames 5 or other suitable means, such as high frequency induction heating coils within component 1 and around component 2, while the respective components are held in ceramic or metallic fluid-cooled parts 6 and 7 effective to prevent the penetration of the heat of the flames 5 except to very slight degree inward of the surfaces 3 and 4 to be joined together.

After the surfaces 3 and 4 have been thus heated, they are slid axially with respect to each other with the surfaces 3 in close telescoping sliding engagement; and, if desired, the axial movement may be accompanied by relative rotation or twisting of the two components 1 and 2, and, when the surfaces 4 abut, there is imparted a further relative rotation to the components 1 and 2 to effect a seizing or galling of the abutting heated surfaces 4.

As a specific example, the diameters 3 of the components 1 and 2 were substantially equal diameter, viz 1.250" with a clearance of about .001" or less between the two surfaces 3. The inner component 2 was of copper containing 20% lead, whereas the outer component 1 was of 24 ST aluminum. The surfaces 3 and 4 of the copper-lead component 2 were heated to the softening point of the 24 ST aluminum component, and the surfaces 3 and 4 of the 24 ST aluminum component were heated to 400–500° F.

Now, as the two components 1 and 2 are slid together quickly before the heat has had an opportunity to penetrate through the 1/8" wall thickness of the respective components and preferably with an accompanying twisting or relative rotation so as to get an agglomeration of the interfacial surface material such as nickel powder dusted or sprayed onto the surfaces 3 and 4 of the copper-lead component 2.

This assembly of components 1 and 2 was accomplished without causing pronounced lead sweating even when the component 2 was a high leaded bronze containing as much as 20% lead. The union herein between surfaces 3 and 4 is effected in somewhat similar manner to the result attained when a seizure is effected between a mandrel and a surrounding bushing due to overheating, galling, and pressure, and sometimes simply due to lack of lubrication. Obviously, many different metals may be assembled in this way, and a good sound bond is effected in each instance.

In the case of flat metal strips, it has been discovered that the mere pressing together of heated faces thereof does not accomplish as good a bond as the combination of pressing and sliding; and, of course, the pressing and sliding plus twisting still further improves the bond, and the results are more uniform, in addition.

In FIG. 3, the composite metal article comprises two split bushings 9 and 10 united together as just described along their closely telescoped surfaces 11 by relative axial sliding or by relative axial sliding and twisting. The seams 12 and 13 of said bushings 9 and 10 may be welded together as is disclosed in my copending application Ser. No. 461,459, filed October 11, 1954, now Patent No. 2,808,493, before uniting said bushings together, or said bushings may be joined without pre-welding of said seams.

In FIG. 4, the components 15 and 16 with heated faces 17 are slid across each other linearly, as represented by dotted lines, while at the same time the two strips are presssed together at their meeting, heated faces 17 while held in supports 18 and 19. The pressure involved when pressing and sliding the components 15 and 16 of aluminum and copper-lead alloy is generally between 500 and 1000 p.s.i. and this applies to the axial pressure between surfaces 4 of the example given in the FIGS. 1 and 2 method.

FIG. 5 illustrates a further modification wherein the heated faces 20 of components 21 and 22 are pressed together with one component 21 disposed as shown in the dotted lines, and the other component 22 being at an angle thereto, and then by applying pressure and relative rotation, the two components 20 and 21 are slid together with a twisting action to weld or bond the faces 20 together.

As further examples of this invention, a copper bar or piece of copper tubing or split bushing part with 20% lead alloyed therewith will first be made to the required dimensions, so that the outside diameter of the copper-lead component is the same or within .001" of the inside diameter of the aluminum component which may be extruded, cast, or turned from bar stock.

In order to weld the outside diameter of the high leaded copper component to the aluminum piece so as to produce a composite bearing, a lattice of nickel particles may be first applied to the copper piece as by molten metal particulate spraying or metal powder dusting as is disclosed in my copending application Serial No, 44,305, filed August 14, 1948, now Patent No. 2,691,208, granted October 12, 1954. Instead of the nickel particulate layer, a tin mixture may be used or other known particulate metals may be applied which will effect a bond between the copper and the aluminum as a eutectic alloy.

As aforesaid, the inner face of the aluminum may be heated to a slight depth by a high frequency coil or by means of heating flames 5 as shown in FIG. 1, and the outer surface of the copper-lead component may be similarly heated to a slight depth to facilitate the bonding and sliding together, and then the two pieces are pushed together while being held in an apparatus which will prevent the bodies of metal themselves from becoming distorted and will effect a seizure along the slidably fitted inner faces of the parts due to mechanical galling assisted by the slight-depth heating of the faces which permits orientation of the sliding faces and promotes lubrication while movement, sliding, and galling is being effected and promotes seizure immediately upon cessation of the sliding effect.

As aforesaid, a twisting effect can accompany the sliding effect and is particularly desirable where, for example, the parts to be joined have telescoped cylindrical surfaces as well as radial flanges which are to be abutted and joined together. The amount of relative twisting should be at least 1/16 turn and preferably about 1/8 turn.

One of the principal features of this method is the maintenance of the to-be-joined components substantially in their machined or manufactured condition without disturbing substantially the structure of either of the components, whereby the hardness, the alloy ingredient distribution, the tensile strength, the compressive strength, as well as other physical characteristics remain unaltered except for the thin slightly modified eutectic alloy interface. In this way, the characteristics of the finished composite article are predictable and are not made contingent upon subsequent heat treatment which is difficult to accomplish due to dissimilarity of the metals involved.

It is possible with my method to achieve a bonding together between a 24 ST aluminum sleeve and a 20% lead-copper liner without any bonding particles therebetween with interface surface heating and sliding together while keeping the principal mass of metal, other than the to-be-welded faces, in a solid condition. Fusion of the surfaces to be bonded is possible with less force and friction to bond and bonding with slight heat to annealing temperatures of the to-be-bonded faces is possible with greater forces to effect sliding and galling.

The interface coating of the parts to be united may be applied to various combinations such as silver and copper, silver and steel, titanium and copper, silver and aluminum alloys. Various eutectic alloys can be made to almost any melting point when a bonding agent such as nickel powder, nickel and tin, germanium, indium, silver, tin, lead, or iron are used.

Where low-temperature eutectics are secured, the requirement for cooling of the remote portions of the components other than the faces to be joined is less necessary or not necessary at all where the heating is quickly effected and at relatively low temperatures.

It is preferred to join the faces of the components as quickly as possible to avoid loss of heat or change of surface temperatures after heating.

The facial heating, as aforesaid, can be effected by high frequency, by heating flame, or by other means, and may be done in a vacuum chamber or in a chamber containing an inert atmosphere. Where eutectic alloy bonding agents are not employed, it is essential that fluid cooling be utilized on at least one member to be joined, that is, on the member where substantial facial heating is effected, and it is generally desirable that the joining of the surfaces be effected in a time interval of one second or less.

The assembly is machined to accurate desired tolerance if need be after joining interfacially and hence to-be-joined components are greater in size to allow for the finish machining than in the assembled united article.

According to this invention, it is also possible to join, for example, a copper or bronze sintered liner which, of course, is porous, made by briqueting, for example, copper powder and sintering the briquet, and after joining up to the aluminum or steel outer sleeve, or backing up metal, the sintered component may be impregnated, for example, with molten lead or any other metal which is desired and which has a lower melting point than the component to be impregnated.

This impregnation can be carried out in partial vacuum, if desired. I have found that a suitable way of impregnating with lead is to dip the sintered, assembled liner unitized with the aluminum sleeve into a pool of lead protected by molten salt such as potassium nitrate, which also serves to preheat the article face with the sintered material prior to immersion in the lead therebelow. The lead is kept at sufficiently high temperature to assist in keeping the salt bath thereover molten. Obviously, other salts may be used to preheat the assembly prior to immersion in the molten metal. Borides may also be used.

Another way of impregnating the sintered sleeve after it has been attached to the outside sleeve is to have a guide rod and tube extending down from the bottom of the molten metal with the molten bath thereover so that the piece to be impregnated can be pushed down through, and the impregnating metal can be solidified prior to ejecting through a cooling die below the pool of molten metal. This is similar to the apparatus used in Brennan application, Serial No. 202,707, now abandoned.

A simple sintered bushing of any kind can be advantageously impregnated with a metal of lower melting point with similar apparatus. It is desirable, in any case, to quickly cool and quench the impregnated article.

In any case, when impregnation is accomplished by immersion in a molten salt bath over a molten metal bath, the joined components and their interface must have a high melting point and must not be corrosively attacked by the impregnating metal.

In case the impregnated part is passed through a cooling die adjacent to the molten metal pool to the part which it is desired to impregnate when enclosing the assembly in a protective shell as of graphite which may be passed down through the molten salt bath, and the molten metal, and through the cooling die, and in this way avoid casting the impregnating metal in unwanted volume or quantity around the part to be impregnated.

Referring further to the foregoing procedures and particularly FIG. 6 herein, the strip 25 as of steel, for example, may have fused thereto as by high frequency inductor 26 a very fine open network as of nickel powder or nickel spray 27 achieved as taught in Serial No. 44,305, for example, now Patent No. 2,691,208 to Brennan. Then a sintered, porous layer 28 as of copper powder is bonded to the steel strip 25 or to the fused nickel layer thereon, as the case may be, at say 1500° F., heating of the copper deposited from hopper 29 being effected as by high frequency inductor 30.

The sintered copper layer 28 is then impregnated with a metal such as lead, or lead and tin, or other desired metal, by passage of the strip 25 and layer 28 thereon over a rotary wheel 31 and through the impregnating metal bath 32 and through a molten salt pre-heating bath 33 of potassium nitrate, for example.

Finally, the impregnating metal 32 is solidified by passage of the composite metal strip through a fluid-cooled die 34. It has been found that the fused salt 33 over the molten impregnating metal 32 preheats the porous sintered layer 28 and also drives out gases from the interstices thereof so that the impregnating metal easily and uniformly penetrates the pores.

Any of these processes may be carried out in a vacuum or in a suitable inert atmosphere.

What is claimed is:

1. A method of producing composite metal articles from dissimilar, bondable metal components, each component being dimensionally preshaped and having a mating surface, which comprises heating such mating surface of each component whereby the surface of the metal component having the higher melting point is heated at least to the softening temperature of the other metal component without softening the former, simultaneously cooling each component to confine the effect of such heating to such mating surface, and slidably engaging such heated surfaces with each other without substantially disturbing such preshaped dimensions of either component by bodily relatively moving such components while such surfaces are in contact with one another to bond such components together.

2. A method of producing composite metal articles from dissimilar, bondable metal components, each component being dimensionally preshaped and having a mating surface, which comprises heating such mating surface of the metal component having the higher melting point to approximately the softening temperature of the other metal component without softening the former, simultaneously cooling such former component to confine the effect of such heating to such mating surface, relatively twisting and pressing together such heated surface with a surface of the other metal component, and simultaneously with such twisting and pressing restricting distortion of such components to bond such metal components together without upsetting the dimensions of the preshaped components.

3. A method of producing composite tubular metal bushings consisting of dissimilar, bondable metal components that are dimensionally preshape and have a sliding telescopic fit one within the other, which comprises heating the telescoping surface of the metal component having the higher melting point to approximately the softening temperature of the mating telescoping surface of the other metal component without softening the former, simultaneously cooling such former metal component to confine the effect of such heating to the telescoping surface thereof, slidably telescoping such components, and simultaneously with such telescoping action containing the components in holding parts to prevent distortion of such components while effecting a seizure between such telescoping surfaces and thereby avoid altering the size of the metal bushing.

4. A method of producing composite tubular metal bushings consisting of dissimilar, bondable metal components that are preshaped and have a sliding telescopic fit one within the other and abutting flanges, which comprises heating the telescoping surface and the abutting flange surface of the metal component having the higher melting point to approximately the softening temperature of the corresponding telescoping surface and abutting flange surface of the other of such components without softening the former component, engaging each component with supporting means at a non-telescoping surface to resist distortion of each component during a telescoping action, cooling the supporting means of the metal component having the higher melting point to confine the effect of such heating to the telescoping surface thereof, then telescoping the metal components to bond together such telescoping surfaces and to abut such flange surfaces with each other, and relatively rotating the telescopic components at least when such flange surfaces abut each other to bond the same together without substantially disturbing the dimensions of either preshaped metal component.

5. A method of producing composite metal articles from dissimilar, bondable metal components which comprises applying heat to a surface of the metal component having the higher melting point to raise it to a temperature sufficient to soften the other metal component without softening the former, simultaneously cooling the metal component having the higher melting point to maintain substantially the entire thickness of such metal component at a substantially lower temperature which does not affect the physical properties thereof while confining the effect of the heat so applied substantially to such surface, and slidably engaging the heated surface with a surface of the other metal component without substantially disturbing the dimensions of either to unite said components together.

6. A method of producing aluminum backed bronze bearings from preshaped aluminum and bronze components comprising heating a surface of the bronze component to approximately the softening temperature of the aluminum backing component, simultaneously cooling the bronze component to confine the effect of such heating to the heated surface thereof, slidably engaging such heated surface with a surface of the aluminum backing component, and simultaneously containing both components in holding parts to prevent distortion of the components while effecting a seizure between such surfaces and thereby avoid altering the dimensions of such preshaped components.

7. A method of producing composite metal strip from preshaped strips of dissimilar, bondable metal which comprises heating one face of the metal strip having a higher melting point to a temperature sufficient to soften the other metal strip without softening the former, simultaneously cooling the heated strip to confine the heating substantially to such face of the strip, slidably engaging such heated face with a face of the other metal strip, pressing the strips together simultaneously with such engagement to prevent distortion of such strips while effecting a seizure between such faces of the strips and thereby avoid altering the preshaped size of the strips.

References Cited in the file of this patent

UNITED STATES PATENTS

| | | |
|---|---|---|
| 427,924 | Smith | May 13, 1890 |
| 787,742 | Eigen | Apr. 18, 1905 |
| 1,220,772 | Murray | Mar. 27, 1917 |
| 1,449,200 | Shipman | Mar. 20, 1923 |
| 1,624,501 | Nelson | Apr. 12, 1927 |
| 1,661,448 | Taylor | Mar. 6, 1928 |
| 2,003,625 | Boyer | June 4, 1935 |
| 2,007,221 | Smith | July 9, 1935 |
| 2,032,685 | Coe | Mar. 3, 1936 |
| 2,060,034 | Chandler | Nov. 10, 1936 |
| 2,094,495 | Robinson et al. | Sept. 28, 1937 |
| 2,223,499 | Schon | Dec. 3, 1940 |
| 2,335,958 | Parker | Dec. 7, 1943 |
| 2,438,866 | Rockwell et al. | Mar. 30, 1948 |
| 2,450,339 | Hensel | Sept. 28, 1948 |
| 2,482,178 | Harris | Sept. 20, 1949 |
| 2,503,429 | Ziegler | Apr. 11, 1950 |
| 2,539,246 | Hensel | Jan. 23, 1951 |
| 2,662,500 | Fort et al. | Dec. 15, 1953 |
| 2,691,208 | Brennan | Oct. 12, 1954 |
| 2,698,548 | Sowter | Jan. 4, 1955 |
| 2,707,821 | Sowter | May 10, 1955 |

(Other references on following page)

UNITED STATES PATENTS

| | | |
|---|---|---|
| 2,735,170 | Moffatt | Feb. 21, 1956 |
| 2,751,808 | MacDonald et al. | June 26, 1956 |
| 2,768,433 | O'Donnell | Oct. 30, 1956 |
| 2,782,498 | Mushovic et al. | Feb. 26, 1957 |
| 2,837,818 | Storchheim | June 10, 1958 |
| 2,879,587 | Mushovic et al. | Mar. 31, 1959 |

FOREIGN PATENTS

| | | |
|---|---|---|
| 711,742 | Great Britain | July 7, 1954 |

OTHER REFERENCES

Ser. No. 292,740, Bernstorff et al. (A.P.C.), published July 13, 1943.